United States Patent
Weitzel et al.

(12)

(10) Patent No.: US 6,262,163 B1
(45) Date of Patent: Jul. 17, 2001

(54) PROCESS FOR PREPARING PROTECTIVE-COLLOID-STABILIZED VINYL ESTER OR VINYL ESTER-ETHYLENE POLYMERS IN THE FORM OF THEIR AQUEOUS DISPERSIONS

(75) Inventors: Hans-Peter Weitzel, Reischach; Udo Kotschi; Manfred Hannebaum, both of Burghausen, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/280,923

(22) Filed: Mar. 29, 1999

(30) Foreign Application Priority Data

May 14, 1998 (DE) ................................. 198 21 745

(51) Int. Cl.$^7$ .................................................. C08L 31/06
(52) U.S. Cl. ..................... 524/460; 524/823; 524/825; 524/820; 526/209; 526/210; 526/319; 526/303.1; 526/317
(58) Field of Search .................... 526/319, 209, 526/210, 225, 303, 317; 524/823, 825, 820, 460

(56) References Cited

U.S. PATENT DOCUMENTS

| 3,957,711 | 5/1976 | Powanda et al. ................. 260/29 |
| 4,043,961 | * 8/1977 | Berezniewicz et al. .......... 523/411 |
| 4,510,274 | * 4/1985 | Okizaki et al. .................. 523/411 |

FOREIGN PATENT DOCUMENTS 0894809   2/1999  (EP).

OTHER PUBLICATIONS

Derwent Abstract corresponding to EP 0894809 AN (1999–108310).
Derwent Abstract 182–874E, Bagdasaraya et al.*

* cited by examiner

*Primary Examiner*—Donald R. Wilson
*Assistant Examiner*—Tanya Zalukaena
(74) *Attorney, Agent, or Firm*—Burgess, Ryan & Wayne; Milton J. Wayne; William R. Moran

(57) ABSTRACT

The invention relates to a process for preparing protective-colloid-stabilized vinyl ester or vinyl ester-ethylene polymers in the form of their aqueous dispersions by emulsion polymerization in the presence of one or more protective colloids, which comprises carrying out the polymerization in the presence of a hydrophobic but silane-free protective colloid based on (meth)acrylate polymers with from 80 to 95% by weight, based on the total weight of the copolymer, of acrylic or methacrylic esters of aliphatic alcohols having from 1 to 12 carbon atoms, and from 5 to 20% by weight, based on the total weight of the copolymer, of ethylenically unsaturated mono- or dicarboxylic acids, and with a glass transition temperature Tg of the copolymer of from 60 to 120° C., and with a Fikentscher K value of the copolymer of from 20 to 50.

12 Claims, No Drawings

PROCESS FOR PREPARING PROTECTIVE-COLLOID-STABILIZED VINYL ESTER OR VINYL ESTER-ETHYLENE POLYMERS IN THE FORM OF THEIR AQUEOUS DISPERSIONS

BACKGROUND OF THE INVENTION

1) Field of the Invention

The invention relates to a process for preparing vinyl ester or vinyl ester-ethylene polymers in the form of their aqueous dispersions, and also to the use of the resultant dispersions as adhesives or textile binders.

2) Background Art

Aqueous synthetic resin dispersions and corresponding powders have for many years been indispensable additives for applications in the construction sector, for example for renders, mortars, reinforcement compositions, self-leveling compositions, tile adhesives, paints and composite thermal insulation systems. Especially for high-quality renders, there is constantly increasing use of binders which give properties such as better mechanical properties, better weathering resistance and lower susceptibility to soiling.

When highly hydrophobic properties are to be achieved, but with good water vapor permeability, as is the case with silicate renders, use is frequently made of synthetic resins made from hydrophobic monomers, such as vinyl chloride or styrene/butyl acrylate. Vinyl chloride is particularly attractive on cost grounds and its use has been popular in the past. For environmental reasons it is now undesirable. In addition, renders formulated with binders comprising vinyl chloride are highly sensitive to other additives required, such as thickeners or antifoams, and this means that the good hydrophobic properties are often lost when mixing specifications change, for example when there is a change in the type of antifoam. EP-A 217380 (U.S. Pat. No. 4,748,202), for example, describes dispersions comprising VC which are polymerized in the presence of a protective colloid that becomes completely dissolved during the polymerization.

WO 94/20556 (U.S. Pat. No. 5,708,093) recommends copolymerization of silanes to improve wet adhesion and to hydrophobicize aqueous coating compositions. The silanes are incorporated into the shell of core-shell polymers. A disadvantage here is the reduction in storage stability resulting from the incorporation of silane units.

EP-A 338486 describes a process for preparing core-shell polymers where these polymers are non-silanized and are prepared in the presence of a water-soluble protective colloid. The protective colloids used are very low-molecular-weight polymers which become completely dissolved during the polymerization. These dispersions are unsuitable for hydrophobicization in construction applications, because they do not give a lasting hydrophobicization independent of the mixing specification.

The object of the invention was to develop a dispersion which is attractive on cost grounds, environmentally accepted, i.e. free of vinyl chloride, and resistant to freezing and thawing, and whose properties in building applications, for example renders, are good and comparable with those of the vinyl chloride dispersions used hitherto, and which also has the advantage that the hydrophobic properties of the render formulation are less sensitive to changes within the other components.

SUMMARY OF THE INVENTION

The invention provides a process for preparing protective-colloid-stabilized vinyl ester or vinyl ester-ethylene polymers in the form of their aqueous dispersions by emulsion polymerization in the presence of one or more protective colloids, which comprises carrying out the polymerization in the presence of a hydrophobic but silane-free protective colloid based on (meth)acrylate polymers with from 80 to 95% by weight, based on the total weight of the copolymer, of acrylic or methacrylic esters of aliphatic alcohols having from 1 to 12 carbon atoms, and from 5 to 20% by weight, based on the total weight of the copolymer, of ethylenically unsaturated mono- or dicarboxylic acids, and with a glass transition temperature Tg of the copolymer of from 60 to 120° C., and with a Fikentscher K value of the copolymer of from 20 to 50.

DESCRIPTION OF THE PREFERRED EMBODIMENTS

Preferred vinyl esters are vinyl acetate, vinyl propionate, vinyl butyrate, vinyl 2-ethyl hexanoate, vinyl laurate, 1-methylvinyl acetate, vinyl pivalate and vinyl esters of alpha-branched monocarboxylic acids having from 5 to 11 carbon atoms, such as VeoVa9$^R$, VeoVa10$^R$, or VeoVa11$^R$ (Shell tradenames). Particular preference is given to vinyl acetate polymers or vinyl acetate copolymers with a proportion of from 1 to 25% by weight of olefinic comonomers, such as ethylene or propylene. In another particularly preferred embodiment, from 1 to 30% by weight of other vinyl esters may be copolymerized alongside vinyl acetate or alongside vinyl acetate and ethylene, for example vinyl 2-ethylhexanoate, vinyl laurate, 1-methylvinyl acetate, vinyl pivalate or vinyl esters of alpha-branched monocarboxylic acids having from 5 to 11 carbon atoms.

Other comonomers which may be copolymerized if desired are from 0.05 to 10.0% by weight, based on the total weight of the monomers, of comonomers selected from the class including ethylenically unsaturated mono- and dicarboxylic acids and amides of these, for example acrylic acid, methacrylic acid, maleic acid, fumaric acid, itaconic acid, acrylamide and methacrylamide; ethylenically unsaturated sulfonic acids and salts of these, preferably vinylsulfonic acid, 2-acrylamidopropanesulfonate and N-vinylpyrrolidone. The data in percent by weight are always based here on the total weight of the vinyl ester or vinyl ester-ethylene copolymer and in each case give 100% by weight in total.

Suitable protective colloids are based on (meth)acrylate polymers with, based on the total weight of the copolymer, from 80 to 95% by weight, preferably from 90 to 95% by weight, of units of acrylic or methacrylic esters of aliphatic alcohols having from 1 to 12 carbon atoms and from 5 to 20% by weight, preferably from 5 to 10% by weight, based on the total weight of the copolymer, of units of ethylenically unsaturated mono- or dicarboxylic acids, and with a glass transition temperature Tg of the copolymer of from 60 to 120° C., and with a Fikentscher K value of the copolymer of from 20 to 50.

Preferred (meth)acrylates for the protective colloid are methylacrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate and 2-ethylhexyl acrylate. Particular preference is given to methyl acrylate, methyl methacrylate, n-butyl acrylate and 2-ethylhexyl acrylate.

Preferred ethylenically unsaturated carboxylic acids are acrylic acid, methacrylic acid, maleic acid, fumaric acid and itaconic acid.

Other comonomers which may be copolymerized if desired are from 0.05 to 10.0% by weight, based on the total weight of the monomers, of comonomers selected from the class including ethylenically unsaturated carboxamides, such as acrylamide or methacrylamide, ethylenically unsaturated sulfonic acids and salts of these, preferably vinylsulfonic acid, 2-acrylamidopropanesulfonate, hydroxyfunctional comonomers, such as hydroxyethyl acrylate, and N-vinylpyrrolidone.

The most preferred copolymers are those of ethyl methacrylate, butyl acrylate and methacrylic or acrylic acid in the amounts given above.

The polymeric formulation of the protective colloid is selected in such a way as to give a glass transition temperature Tg of from 60 to 120° C. Preference is given to protective colloids with a Tg of from 60 to 90° C. The glass transition temperature Tg of the polymers can be determined in a known manner using differential scanning calorimetry (DSC). The Tg can also be approximated using the Fox equation. According to T. G. Fox, Bull. Am. Physics Soc. 1, 3, page 123 (1956): $1/Tg = x_1/Tg_1 + x_2/Tg_2 + \ldots + x_n/Tg_n$, where $x_n$ is the proportion by weight (% by weight/100) of the monomer n and $Tg_n$ is the glass transition temperature in degrees Kelvin of the homopolymer of monomer n. Tg values for homopolymers are listed in Polymer Handbook 3rd Edition, J. Wiley & Sons, New York (1989).

The K value of the protective colloids is from 20 to 50, preferably from 30 to 40, determined by a method based on DIN 53726 in 1% strength solution of tetrahydrofuran in water. The K value and Tg of the polymers here are balanced in such a way that, even under the conditions of polymerization, at elevated temperature (from 30 to 80° C.) and at a pH of 7, the protective colloid does not dissolve completely, i.e. the solubility in water under these conditions is not more than 10% by weight of the amount of protective colloid used.

The copolymer used as protective colloid is prepared by known methods of emulsion polymerization at low pH values of from about 2 to 4. The protective colloid may be isolated as a dispersion, but it may also be polymerized in a first step and the subsequent emulsion polymerization of the vinyl ester or vinyl ester-ethylene polymer carried out directly afterward in the same reaction vessel.

The proportion of protective colloid, based on the total weight of the comonomers, is from 5 to 25% by weight, preferably from 10 to 15% by weight.

The vinyl ester and vinyl ester-ethylene polymers are prepared by emulsion polymerization in conventional reactors or pressure reactors in the temperature range from 30 to 80° C. and are initiated using the methods conventionally used for emulsion polymerization. In the case of copolymerization of gaseous monomers, such as ethylene, it is preferable to use a pressure of from 5 to 85 $bar_{abs}$. The reaction is initiated using the familiar free-radical generators which are at least to some extent water-soluble, used preferably in amounts of from 0.01 to 3.0% by weight, based on the total weight of the monomers. Examples of these are sodium sulfate, hydrogen peroxide, tert-butyl peroxide, tert-butyl hydroperoxide; potassium peroxodiphosphate and azobisisobutyronitrile. If desired, the free-radical initiators mentioned may also be combined in a known manner with, based on the total weight of the monomers, from 0.01 to 0.5% by weight of reducing agents. Examples of suitable reducing agents are alkali metal formaldehyde sulfoxylates and ascorbic acid. For redox initiation it is preferable here to meter in one or both redox catalyst components during the polymerization.

If desired, from 1 to 10% by weight of emulsifier, based on the weight of the vinyl ester polymer, may be used in the polymerization in addition to the protective colloid. Either anionic, cationic or nonionic emulsifiers are suitable. Examples of suitable compounds are anionic surfactants, such as alkyl sulfates having a chain length of from 8 to 18 carbon atoms, alkyl or alkylaryl ether sulfates having from 8 to 18 carbon atoms in the hydrophobic radical and up to 40 ethylene or propylene oxide units, alkyl- or alkylarylsulfonates having from 8 to 18 carbon atoms, and esters and monoesters of sulfosuccinic acid with monohydric alcohols or alkylphenols. Examples of suitable nonionic surfactants are alkyl polyglycol ethers and alkylaryl polyglycol ethers having from 8 to 40 ethylene oxide units.

The polymerization may be carried out as a batch, semi-batch or feed process, or else continuously. Preference is given to the feed process, where the major part of the monomers is introduced continuously. The protective colloid may be entirely within the initial charge or entirely in the feed, and combinations of initial charge and feed are also possible. It is preferable for the protective colloid to be entirely within the initial charge. The pH set during the polymerization is from 5 to 7.5, preferably from 6.5 to 7.5.

The aqueous dispersions obtainable by the novel process have a solids content of from 30 to 75% by weight, preferably from 40 to 65% by weight.

The protective-colloid-stabilized polymers may be used as a dispersion in the application sectors for which they are typical, for example in construction chemistry products, if desired combined with inorganic, hydraulically setting binders, such as cements (Portland, alumina, pozzolanic, slag, magnesia or phosphate cement), plaster of Paris or waterglass, or for producing construction adhesives, renders, troweling compounds, screeds, jointing mortars or paints. They can also be used as sole binders for coating compositions or adhesives or as coating compositions or binders for textiles or paper.

The low level of hydrophobic properties of dispersions comprising vinyl esters has meant that they have hitherto been little used in, for example, renders, since complicated formulation has been required to achieve hydrophobicization of the renders. Use of the dispersions prepared according to the invention has now given renders with surprisingly good hydrophobic properties, despite the use of no additional hydrophobicizing agents and the very hydrophilic base polymer. The high resistance of the dispersions to freezing and thawing should also be emphasized.

The following examples serve to describe the invention further:

EXAMPLE 1

Preparation of the Protective Colloid

A mixture of 744 kg of water, 425 g of mercaptopropionic acid, 30.4 kg of a 25% strength solution of an ethoxylated and sulfated fatty alcohol, 12.8 kg of methacrylic acid, 82.9 kg of methyl methacrylate and 10.6 kg of butyl acrylate was heated to 80° C. A preemulsion composed of 1490 kg of water, 8 kg of mercaptopropionic acid, 231 kg of a 35% strength solution of an ethoxylated and sulfated nonylphenol having 25 EO units, 157 kg of methacrylic acid, 1650 kg of methyl methacrylate and 208 kg of butyl acrylate was fed into this mixture continuously over 4 hours. In parallel with this, a solution made from 7.7 kg of ammonium persulfate and 172 kg of water was fe d in within a period of 5 hours. After the feed had ended, stirring was continued for one hour at 80° C. and the mixture w as then cooled. This gave a, dispersion with a solids content of 44%, a pH of 2.8, a particle size of 130 nm, Tg of 80° C. and K value of 33.

Example 2

Preparation of the Vinyl Ester Polymer

A mixture of 275 g of water and 269 g of the protective colloid from Example 1 was heated to 55° C. A mixture of 520 g of vinyl acetate and 350 g of VeoVa$^R$10 was fed into this mixture continuously within a period of 4 hours. In parallel with this, a solution made from 250 g of water and 15 g of an ethoxylated fatty alcohol, and also a solution made from 6.5 g of tert-butyl hydroperoxide in 80 g of water, and a solution of 4.2 g of hydroxymethanesulfinate in 80 g of water, were fed in within a period of 5 hours. The pH was held at about 7.5, using ammonia. After the feed had ended stirring was continued for one hour at 55° C. and the mixture was then cooled. This gave a dispersion with a solids content of 50.7%, a pH of 7.9, a particle size Dw of 170 nm, Tg of 12° C. and viscosity of 1200 mPas.

Performance test:

Freeze-thaw resistance test:

The dispersion to be studied was frozen at −20° C. within a period of 12 hours. The dispersion was then removed from the freezer and allowed to thaw slowly at room temperature. Qualitative assessments were then made of viscosity change, sedimentation behavior, grittiness and coagulation. Even after 5 freeze-thaw cycles, the dispersion from Example 2 showed no change in viscosity, no tendency to sediment, and indeed no formation of any deposit.

Production of a synthetic resin render:

The dispersion from Example 2 was used to produce a render 1 with the test mixing specification below. The comparison used was a render 2 produced in a similar manner using a commercially available vinyl chloride-ethylene dispersion (Vinnapas LL 529 from Wacker-Chemie) as binder.

Test mixing specification:

| Material | Amount | Function |
| --- | --- | --- |
| Water | 73.2 | |
| Parmetol A23 | 2 | Preservative |
| Dispex N40 | 2 | Dispersing agent |
| Bentone EW 5% | 15 | Thickener |
| Tylose MH2000K 2% | 30 | Thickener |
| Lusolvan FBH | 3 | Film-forming auxiliary |
| Rohagit SD15 | 1 | Thickener |
| Arbocel B400 | 5 | Fibrous filler |
| FPE 910T | 1 | Fibrous filler |
| Kronos 2056 | 30 | Filler |
| Calcilit 100 | 225 | Filler |
| Calcilit 500 | 170 | Filler |
| Dispersion 50% | 129.8 | Binder |
| Calcilit 1.8–2.5 | 320 | Filler |
| Ammonia | 0.5 | |
| Agitan 260 | 2 | Antifoam |

Testing of hydrophobic properties:

The renders produced to the mixing specification above were each dried for, respectively, one day and 7 days at room temperature. A pipette was then used to place a drop of water on the render. The time for the drop of water to disappear completely (penetrate into the render) was used for the evaluation. The maximum time measured was 8 h=480 min, i.e. 480 min indicates that the drop of water remains on the render, and lower values indicate correspondingly poorer hydrophobic properties with the drop of water absorbed more quickly. To test the sensitivity of the mixing specification for the render, the antifoam and thickener constituents (class 1=thickeners with associative action, class 2=celluloses, etc.) were varied and the effect of the change on hydrophobic properties was observed.

The test results are summarized in Tables 1 to 3 below:

TABLE 1

| Render 1 | | Render 2 | |
| --- | --- | --- | --- |
| Antifoam | Hydrophobic properties 1d/7d [min] | Antifoam | Hydrophobic properties 1d/7d [min] |
| Agitan 260 | 450/480 | Agitan 260 | 480/480 |
| none | 480/480 | none | 170/200 |
| Agitan 281 | 330/335 | Agitan 281 | 17/17 |
| Byk 031 | 450/480 | Byk 031 | 270/270 |
| Byk 033 | 445/480 | Byk 033 | 320/320 |
| Foammaster 306 | 280/170 | Foammaster 306 | 4/4 |
| Dehydran 240 | 200/270 | Dehydran 240 | 6/6 |
| S670 | 455/480 | S670 | 150/330 |
| S385 | 440/480 | S385 | 30/30 |
| S887 | 480/480 | S887 | 430/400 |
| S370 | 375/480 | S370 | 10/13 |

TABLE 2

| Render 1 | | Render 2 | |
| --- | --- | --- | --- |
| Thickener 1 | Hydrophobic properties 1d/7d | Thickener 1 | Hydrophobic properties 1d/7d |
| none | 35/17 | none | 100/100 |
| Rheolate 208 | 270/405 | Rheolate 208 | 140/140 |
| Acrysol RM 8W | 480/405 | Acrysol RM 8W | 80/100 |
| Rohagit SD15 | 390/360 | Rohagit SD15 | 120/120 |
| Coatex PE53 | 480/480 | Coatex PE53 | 270/270 |
| Acrysol TT935 | 440/350 | Acrysol TT935 | 380/330 |
| Latekoll D | 460/385 | Latekoll D | 190/190 |
| Polyphob 106E | 335/480 | Polyphob 106E | 330/300 |

TABLE 3

| Render 1 | | Render 2 | |
| --- | --- | --- | --- |
| Thickener 2 | Hydrophobic properties 1d/7d | Thickener 2 | Hydrophobic properties 1d/7d |
| Tylose MH10000K | 480/480 | Tylose MH10000K | 460/430 |
| Natrosol HBR | 480/480 | Natrosol HBR | 430/430 |
| Natrosol plus 331 | 440/330 | Natrosol plus 331 | 240/330 |
| Methocel 228 | 480/480 | Methocel 228 | 400/350 |
| Bermocoll E411FQ | 480/480 | Bermocoll E411FQ | 430/430 |
| Benone EW | 480/480 | Benone EW | 480/430 |
| Rhodopol 50 MD | 480/480 | Rhodopol 50 MD | 360/360 |

It can be seen that render 1 (with the binder prepared according to the invention) is significantly more tolerant to mixing specification changes than is the comparative render 2 (VCE binder).

What is claimed is:

1. A process for preparing protective-colloid-stabilized vinyl ester or vinyl ester-ethylene polymers in the form of their aqueous dispersions by emulsion polymerization in the presence of one or more protective colloids, which comprises carrying out the polymerization in the presence of a hydrophobic but silane-free protective colloid based on (meth)acrylate polymers with from 80 to 95% by weight, based on the total weight of the polymer, of acrylic or methacrylic esters of aliphatic monohydric alcohols having from 1 to 12 carbon atoms, and from 5 to 20% by weight, based on the total weight of the copolymer, of ethylenically unsaturated mono- or dicarboxylic acids, and with a glass transition temperature Tg of the copolymer of from 60 to 120° C., and with a Fikentscher K value of the copolymer of from 20 to 50.

2. The product prepared by the process of claim 1.

3. Coating compositions containing the product of claim 2.

4. A binder composition containing the product of claim 2.

5. An adhesive composition containing the product of claim 2.

6. A textile product containing the binder composition of claim 4.

7. A paper product containing the binder composition of claim 4.

8. A jointing mortar containing the product of claim 2.

9. A paint containing the binder composition of claim 4.

10. Renders containing the product of claim 2.

11. Troweling compounds containing the product of claim 2.

12. Screeds containing the product of claim 2.

* * * * *